(12) United States Patent
Molla et al.

(10) Patent No.: US 12,241,588 B2
(45) Date of Patent: Mar. 4, 2025

(54) SYSTEMS AND METHODS OF MITIGATING LUBRICANT LEAKAGE FROM SEAL ASSEMBLIES

(71) Applicant: SAUDI ARABIAN OIL COMPANY, Dhahran (SA)

(72) Inventors: Hasanur Jamal Molla, Dhahran (SA); Saad H. Al-Dossary, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 148 days.

(21) Appl. No.: 18/314,421

(22) Filed: May 9, 2023

(65) Prior Publication Data
US 2024/0377027 A1  Nov. 14, 2024

(51) Int. Cl.
  *F16N 29/04*  (2006.01)
  *F16N 7/38*  (2006.01)
(52) U.S. Cl.
  CPC ............. *F16N 29/04* (2013.01); *F16N 7/38* (2013.01)
(58) Field of Classification Search
  CPC ........................................ F16N 7/38
  See application file for complete search history.

(56) References Cited

U.S. PATENT DOCUMENTS

| | | | | |
|---|---|---|---|---|
| 3,734,580 A | * | 5/1973 | Piscitelli | F16J 15/443 384/441 |
| 3,779,345 A | * | 12/1973 | Barnes | F01M 1/18 60/39.08 |
| 5,029,876 A | * | 7/1991 | Orlando | F16J 15/4472 415/174.5 |
| 6,062,568 A | * | 5/2000 | Orlowski | F16J 15/443 277/420 |
| 6,416,227 B1 | * | 7/2002 | Ohrndorf | B21B 31/076 384/414 |
| 2009/0280004 A1 | * | 11/2009 | Finkenbinder | F04D 29/102 416/174 |
| 2011/0020114 A1 | * | 1/2011 | Eelman | F16J 15/442 415/174.5 |
| 2017/0059031 A1 | * | 3/2017 | Doertoluk | F03D 80/70 |

(Continued)

FOREIGN PATENT DOCUMENTS

EP       0925424 B1    3/2010

*Primary Examiner* — Michael R Mansen
*Assistant Examiner* — Mark K Buse
(74) *Attorney, Agent, or Firm* — Vorys, Sater, Seymour and Pease LLP

(57) ABSTRACT

A bearing lubrication system includes a bearing housing, a lubricant reservoir communicating with the bearing housing, a seal assembly including a seal housing, an air supply line that injects pressurized air into the seal housing, a control valve arranged within the air supply line and adjustable to regulate flow of pressurized air into the seal housing, a blower that maintains a vacuum inside the lubricant reservoir, and a control system in communication with the control valve. When a pressure inside the bearing housing exceeds a predetermined pressure range, the control system adjusts the control valve to increase air pressure within the seal housing, and increases the blower speed to increase the vacuum pressure. When the pressure descends below the predetermined pressure range, the control system adjusts the control valve to decrease the air pressure, and decreases the blower speed to maintain or decrease the vacuum pressure.

15 Claims, 3 Drawing Sheets

(56) References Cited

U.S. PATENT DOCUMENTS

| | | | | |
|---|---|---|---|---|
| 2018/0023762 A1* | 1/2018 | Kato | ................ | F01D 25/18 |
| | | | | 184/6.4 |
| 2020/0103035 A1* | 4/2020 | Hoehle | ............ | F16J 15/187 |
| 2024/0344511 A1* | 10/2024 | Ji | ..................... | F04B 17/03 |
| 2024/0359715 A1* | 10/2024 | Kumar | ................ | G01H 1/00 |

* cited by examiner

SYSTEMS AND METHODS OF MITIGATING LUBRICANT LEAKAGE FROM SEAL ASSEMBLIES

FIELD OF THE DISCLOSURE

The present disclosure relates generally to seal assemblies and, more particularly, to mitigating lubricant leakage from journal bearing seal assemblies used in conjunction with rotating equipment.

BACKGROUND OF THE DISCLOSURE

Rotating machinery and equipment commonly include a rotor shaft that extends out from at least one end of the rotating equipment and is supported or "journalled" using one or more suitable bearings. Some bearings used to support rotor shafts for rotating equipment are fed with a continuous or intermittent supply of oil, and such bearings are often referred to as "oil-fed bearings". The oil primarily operates as a lubricant that helps mitigate friction and wear between the rotating rotor shaft and the inner walls of the bearing, but can also prevent corrosion and control the temperature of the bearing.

Oil-fed bearings are susceptible to oil leaks, which constitute a common maintenance problem for rotating equipment that can cause down time and even complete equipment failure. The oil provided to the bearings can either migrate to the inside or the outside of the rotating machine during operation. Oil leaks should be addressed promptly due to the fire hazard potential, along with the danger of oil-coated surfaces and the time and money spent cleaning the wasted oil, which then needs to be replenished. Moreover, the environmental impact of waste-oil containment and disposal is always a consideration when dealing with oil leaks in rotating equipment.

What is needed is a system designed to detect oil leaks from bearing housings of rotating equipment, and take automated corrective action to reduce or entirely eliminate oil leakage through bearing seals.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a bearing lubrication system includes a bearing including a bearing housing into which a rotor shaft extends from rotating equipment, a lubricant reservoir containing a liquid lubricant and in fluid communication with the bearing housing, a seal assembly arranged laterally adjacent the bearing housing and including a seal housing that receives a portion of the rotor shaft, an air supply line in fluid communication with the seal housing to inject pressurized air into the seal housing, a control valve arranged within the air supply line and adjustable to regulate a flow of the pressurized air into the seal housing, and a control system in communication with the control valve to adjust an operational position of the control valve, wherein, when a pressure inside the bearing housing exceeds a predetermined pressure range, the control system is programmed to adjust the operational position of the control valve to increase a pressure within the seal housing, and wherein, when the pressure within the bearing housing descends below the predetermined pressure range, the control system is programmed to adjust the operational position of the control valve to decrease the pressure within the seal housing.

According to another embodiment consistent with the present disclosure, a method of lubricating a bearing includes the steps of conveying a liquid lubricant from a lubricant reservoir to a bearing housing of the bearing, wherein a rotor shaft extends from rotating equipment and into the bearing housing, injecting pressurized air from an air supply line into a seal housing of a seal assembly arranged laterally adjacent the bearing housing, wherein a portion of the rotor shaft extends into the seal housing, measuring a pressure within the bearing housing and transmitting pressure readings of the bearing housing to a control system in communication with a control valve arranged within the air supply line, adjusting an operational position of the control valve with the control system to increase a pressure within the seal housing when the pressure inside the bearing housing exceeds a predetermined pressure range, and adjusting the operational position of the control valve with the control system to decrease the pressure within the seal housing when the pressure within the bearing housing descends below the predetermined pressure range.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
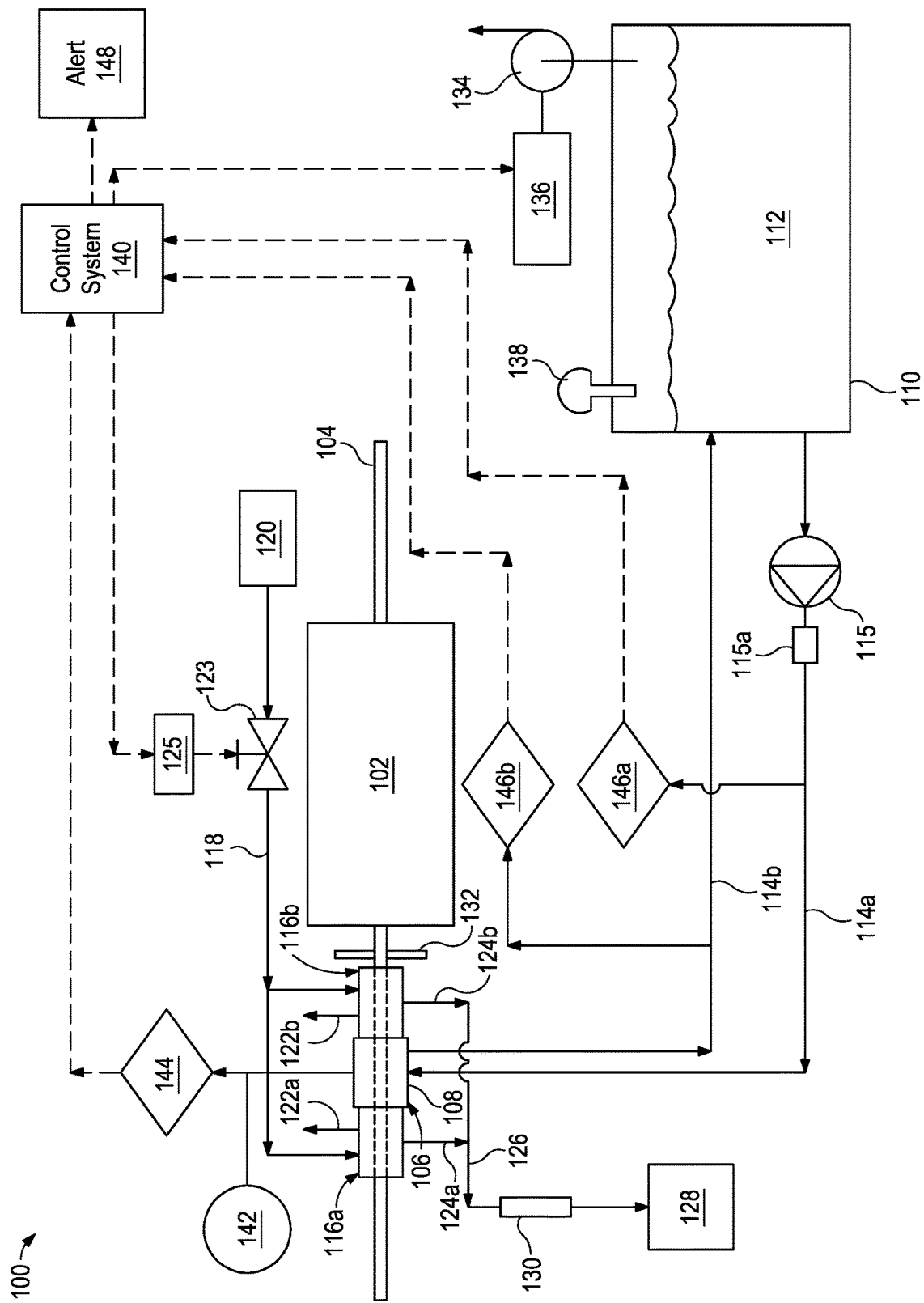
FIG. 1 is a schematic diagram of an example oil lubrication system that may incorporate the principles of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to seal assemblies and, more particularly, to mitigating oil leakage from journal bearing seal assemblies used in conjunction with rotating equipment. Embodiments disclosed herein describe systems and methods for monitoring identified parameters in bearing lubrication systems, and controlling air pressure supplied to a seal assembly based on detected bearing housing pressure, which may help reduce lubricant leakage through the seal assembly. The systems described herein provide methods of implementing automated corrective action to eliminate lubrication leakage through bearing seals. Embodiments disclosed herein describe bearing lubrication systems configured to monitor bearing housing pressure online through pressure gauges and/or pressure transmitters, and controlling a supply of pressurized air to seal assemblies via automatic actuation of a control valve, which ensures effective sealing and prevents migration of liquid lubricant inside or outside of rotating equipment. The bearing lubrication systems described herein may also be configured to monitor potential lubricant leakage using flow transmitters fitted at supply and return lines, and automatically notifying an operator when exceeding the limit for maintenance.

FIG. 1 is a schematic diagram of an example bearing lubrication system 100 that may incorporate the principles of the present disclosure. The bearing lubrication system 100 (hereafter "the system 100") may be configured to support operation of at least one piece of rotating equipment 102. Examples of the rotating equipment 102 include, but are not limited to, a turbomachine, a turbine (e.g., a steam or gas turbine), a compressor, a pump, an expander, a motor (e.g., an electric motor), a gearbox, or any combination thereof.

As illustrated, the rotating equipment 102 includes a rotor shaft 104 that extends through the rotating equipment 102 and exits at least one end of the rotating equipment 102. In the illustrated embodiment, the rotor shaft 104 exits both ends of the rotating equipment, however, in other embodiments, the rotor shaft 104 may exit only one end of the rotating equipment 102. As the rotating equipment 102 operates, the rotor shaft 104 rotates. While not shown in FIG. 1, one or both ends of the rotor shaft 104 may be operatively coupled to corresponding machines or systems. Depending on the type of rotating equipment 102 and its intended operation, such corresponding machines or systems may either be configured to provide torque to the rotor shaft 104 to drive (power) the rotating equipment 102, or receive torque generated by the rotating equipment 102 from the rotor shaft 104. In some cases, for example, the rotating equipment 102 may comprise a pump used to pump a fluid, and in such cases the rotor shaft 104 would drive the rotating equipment 102. In other cases, however, the rotating equipment 102 may comprise a turbine, and in such cases the rotating equipment 102 would power (drive) the rotor shaft 104.

At least one end of the rotor shaft 104 may be journalled and otherwise supported by a bearing 106. While not shown, the opposing end of the rotor shaft 104 may also be supported by a bearing. The bearing 106 includes a bearing housing 108 through which the rotor shaft 104 extends. In the illustrated embodiment, the bearing 106 comprises an oil-fed bearing in fluid communication with a lubricant reservoir 110, which forms part of the system 100. The lubricant reservoir 110 may contain a supply of a liquid lubricant 112 that is provided to the bearing housing 108 to lubricate the bearing 106 during operation (e.g., rotation of the rotor shaft 104). Examples of the liquid lubricant 112 include, but are not limited to, a petroleum oil or a synthetic lubricant.

The bearing 106 fluidly communicates with the lubricant reservoir 110 via a supply line 114a extending between the lubricant reservoir 110 and the bearing housing 108. While the rotor shaft 104 rotates, the liquid lubricant 112 may be supplied to the bearing 106 via the supply line 114a to help mitigate friction and wear between the rotating rotor shaft 104 and the inner walls of the bearing housing 108, and may further help prevent corrosion and control temperature. In some embodiments, the system 100 includes a pump 115 arranged within the supply line 114a and otherwise operable to pump the liquid lubricant 112 to the bearing housing 108. In at least one embodiment, a check valve 115a may be arranged within the supply line 114a on the discharge side of the pump 115 and configured to prevent backflow of the liquid lubricant 112 back into the lubricant reservoir 110. Used liquid lubricant 112 may be conveyed back to the lubricant reservoir 110 via a return line 114b, which extends between the bearing housing 108 and the lubricant reservoir 110.

To help prevent the liquid lubricant 112 from migrating along the rotor shaft 104 and out of either end of the bearing housing 108, the system 100 may further include one or more bearing seals. In the illustrated embodiment, where the rotor shaft 104 extends from both ends of the bearing housing 108, the system 100 may include first and second seal assemblies 116a and 116b arranged laterally adjacent the bearing housing 108. More specifically, the first seal assembly 116a, alternately referred to as an "outboard seal assembly," may be arranged at a first end of the bearing housing 108, and the second seal assembly 116b, alternately referred to as an "inboard seal assembly," may be arranged at the opposing second end of the bearing housing 108. In embodiments where the rotor shaft 104 only extends through one end of the bearing housing 108, however, the system 100 may only include one seal assembly (e.g., the inboard seal assembly 116b), without departing from the scope of the disclosure.

As described in more detail below, one or both of the seal assemblies 116a,b may comprise labyrinth seals. To help prevent the liquid lubricant 112 from migrating along the rotor shaft 104 and being discharged into the environment or inside the rotating equipment 102, pressurized air may be injected into each seal assembly 116a,b via an air supply line 118. The air supply line 118 may be in fluid communication with a source of pressurized air 120, such as an instrument air compressor or the like. As the bearing 106 operates, the pressurized air is injected into the seal assemblies 116a,b, and pressurized air is simultaneously discharged or vented from each seal assembly 116a,b via corresponding air discharge lines 122a and 122b. In some embodiments, the discharged pressurized air is vented to the environment, but could alternatively be recycled back to the source of pressurized air 120.

In some embodiments, as illustrated, a control valve 123 may be arranged within the air supply line 118 and is operable to regulate the flow of the pressurized air into the seal assemblies 116a,b. During normal operation of the bearing 106, the control valve 123 may be arranged at a set orientation between open and closed, thereby injecting a known quantity of the pressurized air into the seal assemblies 116a,b. As described in more detail below, however, the control valve 123 may be adjusted to increase or decrease the flow of the pressurized air into the seal assemblies 116a,b, depending on need. The control valve 123 may be operatively coupled to motor 125, such as a servo or other type of motor operable to adjust the operational position of the control valve 123 between the open and closed positions.

Injecting the pressurized air into the seal assemblies 116a,b helps slow the migration of the liquid lubricant 112 out of the bearing housing 108, along the rotor shaft 104, and out either end of the seal assemblies 116a,b. More specifically, if any liquid lubricant 112 migrates into the seal assemblies 116a,b from the bearing housing 108, the pressurized air injected into the seal assemblies 116a,b will impel the migrating liquid lubricant 112 back into the bearing housing 108. The migrated liquid lubricant 112 accumulated in the seal assemblies 116a,b gets drained out through drain lines 124a and 124b extending from each seal assembly 116a,b. Each drain line 124a,b may communicate with a main drain line 126 in fluid communication with a lubricant disposal tank 128. Accordingly, any liquid lubricant 112 forced out of the seal assemblies 116a,b may be conveyed to the lubricant disposal tank 128 for proper handling and/or disposal.

In some embodiments, the system 100 may further include a sight glass 130 arranged within the main drain line 126. The sight glass 130 may allow a user or operator to view the draining of the liquid lubricant 112 to the lubricant disposal tank 128. The sight glass 130 may allow the operator to monitor the draining of liquid lubricant 112 and confirm that there is no blockage in the drain lines.

In some embodiments, the system 100 may further include a packing seal 132 interposing and otherwise arranged between the inboard seal assembly 116b and the rotating equipment 102. The packing seal 132 may be designed and otherwise configured with minimal clearance against the rotor shaft 104, and may be operable to receive and absorb any liquid lubricant 112 (e.g., a mist of the liquid lubricant 112) that may migrate out of the inboard seal assembly 116b. In at least one embodiment, the packing seal 132 may be made of cellulose fibers. The packing seal 132 may prove advantageous in preventing the migration of the liquid lubricant 112 into the inside of the rotating equipment 102. In some embodiments, the packing seal 132 may change appearance (e.g., color) when it is saturated with the liquid lubricant 112. Upon noticing the change in appearance of the packing seal 132, an operator may then proceed to replace the packing seal 132 for ensuring further effective absorption of the liquid lubricant 112 or a mist of the liquid lubricant 112.

Figure 2:
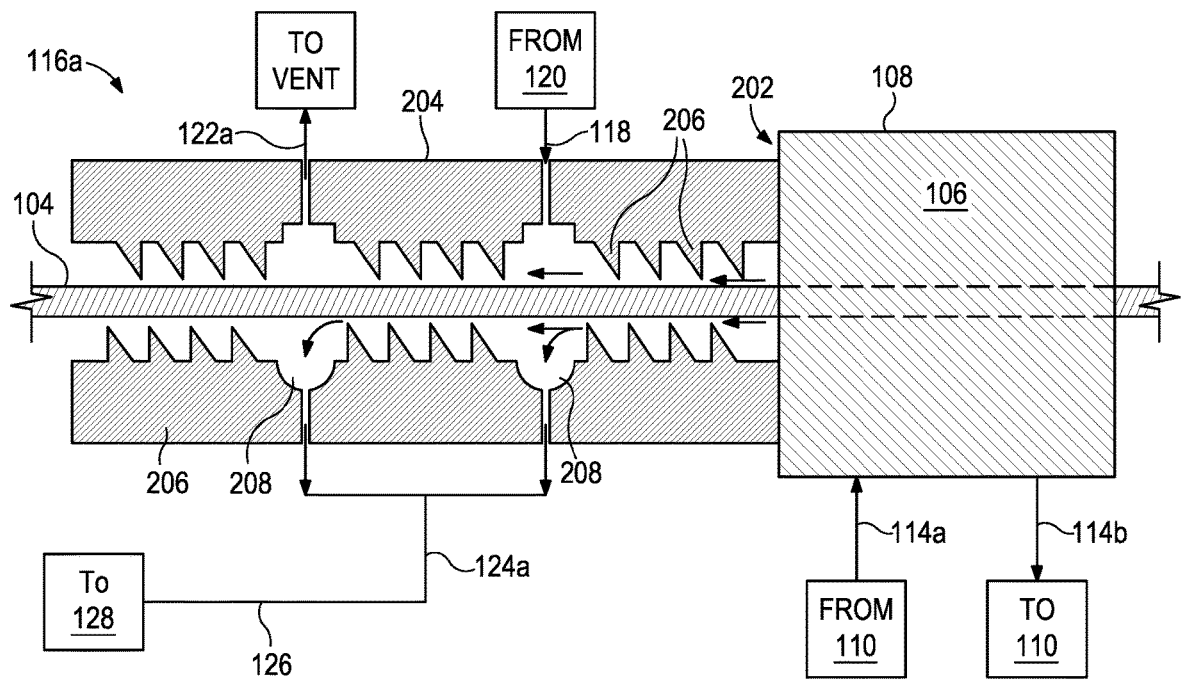
FIG. 2 is an enlarged, schematic view of the bearing and the outboard seal assembly of FIG. 1, according to one or more embodiments.

FIG. 2 is an enlarged, schematic view of the bearing 106 and the outboard seal assembly 116a, according to one or more embodiments. While FIG. 2 depicts the outboard seal assembly 116a, the following discussion is equally applicable to the inboard seal assembly 116b (FIG. 1), without departing from the scope of the disclosure. As mentioned above, the bearing 106 includes the bearing housing 108 and the rotor shaft 104 extends through the bearing housing 108. During operation of the bearing 106, a supply of the liquid lubricant 112 (FIG. 1) from the lubricant reservoir 110 may be conveyed to the bearing housing 108 via the supply line 114a, and used liquid lubricant 112 may be conveyed back to the lubricant reservoir 110 via the return line 114b.

The outboard seal assembly 116a is arranged at a first or "outboard" end 202 of the bearing housing 108 and provides a seal housing 204 sized to receive the rotor shaft 104 therethrough. As illustrated, the outboard seal assembly 116a may comprise a labyrinth seal that provides a plurality of projections or "teeth" 206 that extend radially inward from the seal housing 204 and toward the rotor shaft 104. The radially-projecting teeth 206 provide a tortuous pathway for the liquid lubricant 112 to traverse as it attempts to migrate away from the bearing housing 108, as indicated by the arrows.

To help prevent the liquid lubricant 112 from migrating along the rotor shaft 104, as briefly described above, pressurized air may be injected into the outboard seal assembly 116a via the air supply line 118, which extends from the source of pressurized air 120. As the bearing 106 operates, pressurized air is simultaneously discharged or vented from the outboard seal assembly 116a via the discharge line 122a, as also briefly described above. Injecting the pressurized air into the outboard seal assembly 116a may impel migrating liquid lubricant 112 back into the bearing housing 108. Any migrated liquid lubricant 112 from the bearing housing 108 may accumulate into one or more lubricant accumulation chambers 208 (two shown). The lubricant accumulation chambers 208 may be defined on the bottom half of the seal housing 204, and receive the migrating liquid lubricant 112 under the force of gravity. In the illustrated embodiment, the lubricant accumulation chambers 208 may be in fluid communication with the first drain line 124a, which communicates with the main drain line 126 to convey accumulated liquid lubricant 112 to the lubricant disposal tank 128 for proper handling and/or disposal.

Referring again to FIG. 1, the system 100 may further include a blower 134 in fluid communication with the lubricant reservoir 110. Operating the blower 134 may create a slight vacuum (e.g., a pressure slightly lower than atmospheric pressure) inside the lubricant reservoir 110 and above the fluid level of the liquid lubricant 112. Generating the vacuum inside the lubricant reservoir 110 may help drain the used liquid lubricant 112 from the bearing housing 108 and draw the used liquid lubricant back into the lubricant reservoir 110.

The blower 134 may be operatively coupled to a motor 136 configured to drive operation of the blower 134. In at least one embodiment, the motor 136 may comprise a variable frequency drive (VFD) type of motor. In such embodiments, the speed of the motor 138 may be varied, which may prove advantageous in adjusting the speed of the blower 134 and thereby altering the pressure within the lubricant reservoir 110.

In at least one embodiment, the system 100 may also include a breather 138 in fluid communication with the lubricant reservoir 110 above the fluid level of the liquid lubricant 112. The breather 138 supplies clean (fresh) air into the lubricant reservoir 110, and may also prove advantageous in helping to prevent hydraulic lock within the lubricant reservoir 110.

According to embodiments of the present disclosure, the system 100 may further include a control system 140 operable to monitor, regulate, and control all aspects of the system 100. The control system 140 may comprise a computer having one or more processors and a computer readable medium (or memory) on which programmable instructions may be stored. The computer readable medium can include a nonvolatile or non-transitory memory with data and instructions that are accessible to the processors and executable thereby. The computer readable medium may also be pre-programmed or selectively programmable with instructions for operating the system 100 or any of the method steps described herein.

The system 100 may further include a pressure sensor or gauge 142 in communication with the bearing housing 108 and configured to measure the pressure within the bearing housing 108. A pressure transmitter 144 may communicate with the pressure gauge 142 and may be in communication with the control system 140 via any wired or wireless means. The pressure transmitter 144 may be configured to transmit the real-time pressure within the bearing housing 108 to the control system 140 for processing. It should be noted that, in at least one embodiment, the pressure gauge 142 and the pressure transmitter 144 may be combined into a single component part.

During example operation of the bearing 106, the control system 140 may be programmed to operate the system 100 such that the pressure within the bearing housing 108 is maintained at a level slightly higher than atmospheric pressure. Maintaining a pressure slightly higher than atmospheric pressure may help eliminate ingression of external contaminants into the bearing housing 108, which could damage the bearing 106 or cause the bearing 106 to malfunction. The control system 140 may be programmed with a predetermined pressure range at which the bearing 106 optimally operates. More specifically, the predetermined pressure range may be stored on the memory included in the control system 140, and pressure readings obtained by the pressure gauge 142 may be compared against the predetermined pressure range.

If the pressure inside the bearing housing 108 exceeds the predetermined pressure range, as measured by the pressure gauge 142, the control system 140 may be programmed to increase the pressure within the seal assemblies 116*a,b*. More specifically, the control system 140 may be in communication (either wired or wirelessly) with the motor 125 that controls operation of the control valve 123 arranged within the air supply line 118. When the pressure within the bearing housing 108 exceeds the predetermined pressure range, the control system 140 may be configured to send a command signal to the motor 125, which causes the control valve 123 to be opened to a greater degree, and thereby increasing the airflow to the seal assemblies 116*a,b*. Increasing the airflow to the seal assemblies 116*a,b* will correspondingly increase the pressure within the seal assemblies 116*a,b*, and thereby help to reduce migration of the liquid lubricant 112 from the bearing housing 108 and into the seal assemblies 116*a,b*. This may also help stop leakage of the liquid lubricant 112 from the seal assemblies 116*a,b*, and thereby help eliminate potential migration of the liquid lubricant 112 into the rotating equipment 102 or otherwise to the surrounding atmosphere (environment).

Moreover, when the pressure inside the bearing housing 108 exceeds the predetermined pressure range, the control system 140 may further be programmed to decrease the pressure within the lubricant reservoir 110. More specifically, the control system 140 may be in communication (either wired or wirelessly) with the motor 136, and when the pressure of the bearing housing 108 exceeds the predetermined pressure range, a command signal may be sent to the motor 136 to increase the speed of the blower 134, which correspondingly increases the vacuum within the lubricant reservoir 110. Increasing the vacuum within the lubricant reservoir 110, may help draw the used lubricant liquid 112 from the bearing housing 108 and to the lubricant reservoir 110.

In contrast, if the pressure inside the bearing housing 108 is lower than the predetermined pressure range, the control system 140 may be programmed to decrease the pressure within the seal assemblies 116*a,b*. More specifically, when the pressure within the bearing housing 108 descends below the predetermined pressure range, the control system 140 may be configured to send a command signal to the motor 125, which causes the control valve 123 to be closed to a greater degree, thereby allowing a baseline amount of pressurized air to be injected into the seal assemblies 116*a,b* from the source of pressurized air 120. This decreases the airflow to the seal assemblies 116*a,b*, which correspondingly helps to maintain the pressure in the seal assemblies 116*a,b* above the pressure within the bearing housing 108. Maintaining the pressure in the seal assemblies 116*a,b* above the pressure within the bearing housing 108 reduces migration of the liquid lubricant 112 to the seal assemblies 116*a,b* from the bearing housing 108, while simultaneously helping to stop the liquid lubricant 112 from leaking from the seal assemblies 116*a,b* into the rotating equipment 102 or otherwise to the surrounding atmosphere (environment).

Moreover, if the pressure inside the bearing housing 108 is lower than the predetermined pressure range, the control system 140 may further be programmed to send a command signal to the motor 136 to slow the speed of the blower 134. In such embodiments, the speed of the blower 134 may be slowed to a point where the vacuum inside the lubricant reservoir 110 is maintained at design conditions, thereby facilitating the return of the liquid lubricant 112 from the bearing housing 108 to the lubricant reservoir 110.

In some embodiments, the system 100 may further include a first flowmeter 146*a* arranged within or otherwise in communication with the supply line 114*a*, and a second flowmeter 146*b* arranged within or otherwise in communication with the return line 114*b*. The flowmeters 146*a,b* may be configured to monitor the flow rate of the liquid lubricant 112 within the supply and return lines 114*a,b*, respectively. More specifically, the first flowmeter 146*a* may be configured to measure the flow rate of the liquid lubricant 112 being injected into the bearing housing 108 via the supply line 114*a*, and the second flowmeter 146*b* may be configured to measure the flow rate of the used liquid lubricant 112 returning to the lubricant reservoir 110 within the return line 114*b*.

The first and second flowmeters 146*a,b* may also be in communication (wired or wirelessly) with the control system 140, and thereby able to provide real-time flow rate measurements to the control system 140 for processing. In particular, the control system 140 may be configured to calculate the difference between the flow rates measured by the first and second flowmeters 146*a,b*. When the difference in the flow rates measured by the first and second flowmeters 146*a,b* exceeds a predetermined value, that may be an indication of excessive leakage of the liquid lubricant 112. In such cases, the operator may decide to add additional liquid lubricant 112 to the lubricant reservoir 110 and plan for maintenance to resolve the lubricant leakage issue.

In some embodiments, when the difference in the flow rates exceeds the predetermined value, the control system 140 may be configured to send (transmit) an alert 148. In some embodiments, the alert 148 may comprise an audible or visual signal that may be perceived by an operator. In other embodiments, however, the alert 148 may comprise a notification sent to the operator, such as a text message, an email, or the like. Upon receiving the alert 148, the operator may then proceed to carry out maintenance work to resolve the issue which is causing excessive leakage of the liquid lubricant 112.

Figure 3:
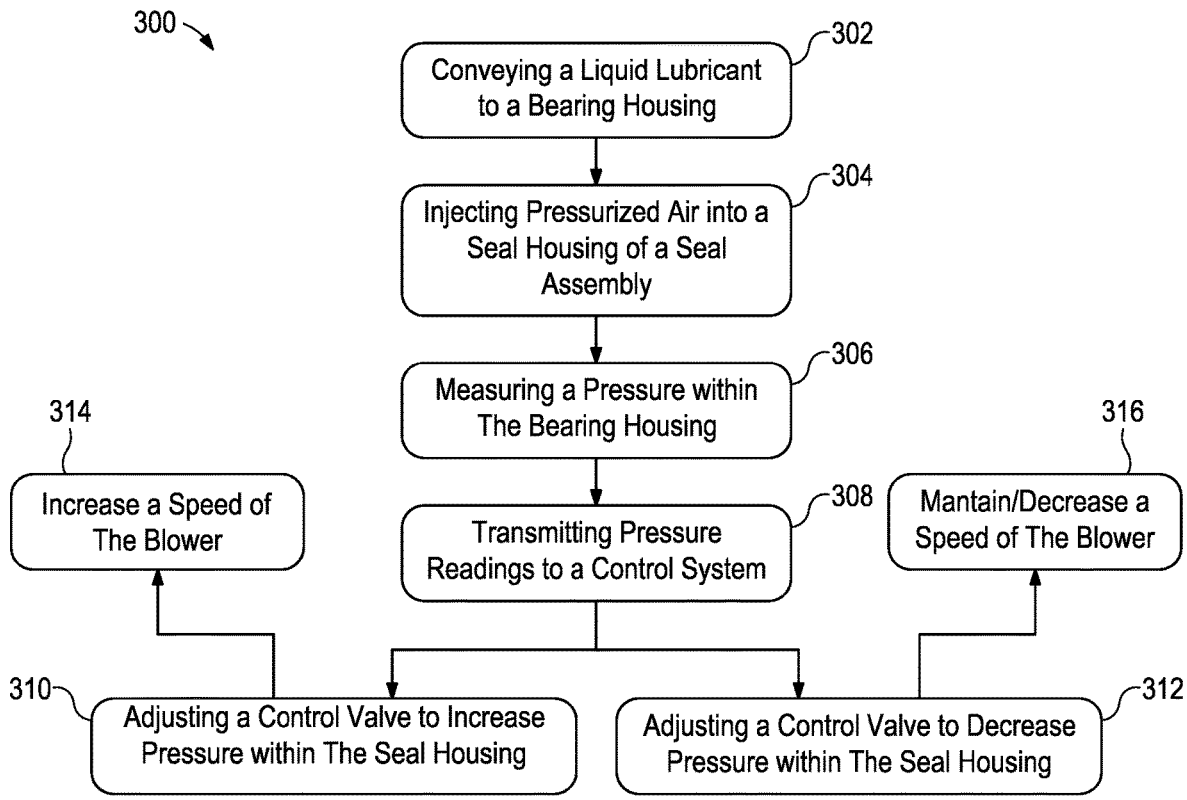
FIG. 3 is a schematic diagram of an example method of lubricating a bearing, according to one or more embodiments of the present disclosure.

FIG. 3A is a schematic diagram of an example method 300 of lubricating a bearing, according to one or more embodiments of the present disclosure. The method 300 may include conveying a liquid lubricant from a lubricant reservoir to a bearing housing of the bearing, as at 302. A rotor shaft may extend from rotating equipment and into the bearing housing. Pressurized air from an air supply line may be injected into a seal housing of a seal assembly arranged laterally adjacent the bearing housing, as at 304. A portion of the rotor shaft may extend into the seal housing.

The method 300 may further include measuring a pressure within the bearing housing, as at 306, and transmitting pressure readings of the bearing housing to a control system in communication with a control valve arranged within the air supply line. The operational position of the control valve may then be adjusted with the control system to increase a pressure within the seal housing when the pressure inside the bearing housing exceeds a predetermined pressure range, as at 310. Alternatively, or in addition thereto, the operational position of the control valve may be adjusted with the control system to decrease the pressure within the seal housing when the pressure within the bearing housing descends below the predetermined pressure range, as at 312.

When the pressure within the bearing housing exceeds the predetermined pressure range, as at 310, the method 300 may further include sending a command signal from the control system to increase the speed of a blower, as at 314. This will increase a vacuum pressure within the lubricant reservoir. When the pressure within the bearing housing descends below the predetermined pressure range, however, as at 312, the method 300 may further include sending a command signal from the control system to either maintain or decrease the speed of a blower, as at 316. This will either maintain or decrease the vacuum pressure within the lubricant reservoir.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the control system 140 of FIG. 1. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 4:
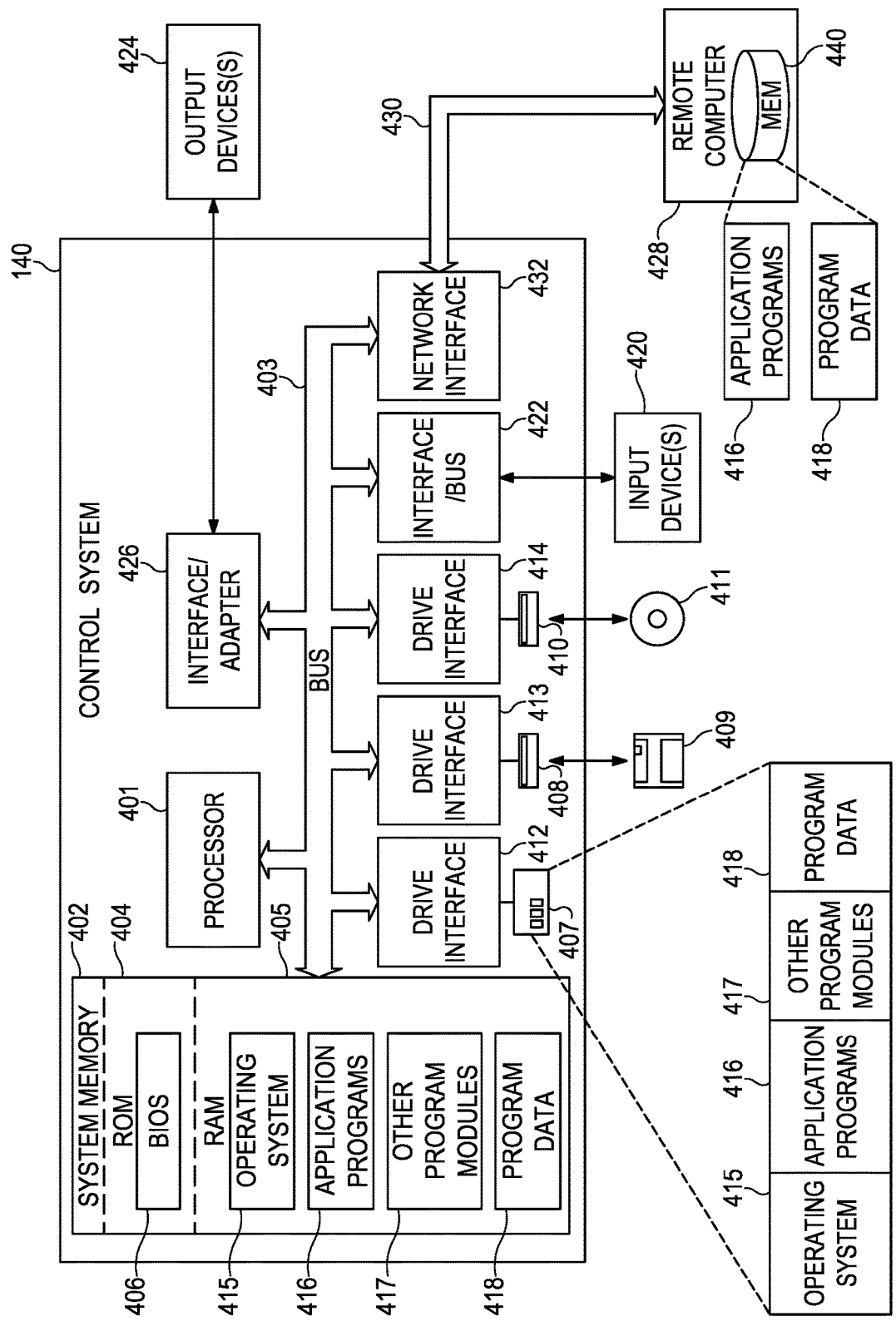
FIG. 4 is a schematic diagram of the control system of FIG. 1 that can be employed to execute one or more embodiments of the present disclosure.

In this regard, FIG. 4 illustrates one example of the control system 140 that can be employed to execute one or more embodiments of the present disclosure. Control system 140 can be implemented on one or more general purpose networked computer systems, embedded computer systems, routers, switches, server devices, client devices, various intermediate devices/nodes or standalone computer systems. Additionally, control system 140 can be implemented on various mobile clients such as, for example, a personal digital assistant (PDA), laptop computer, pager, and the like, provided it includes sufficient processing capabilities.

Control system 140 includes processing unit 401, system memory 402, and system bus 403 that couples various system components, including the system memory 402, to processing unit 401. Dual microprocessors and other multi-processor architectures also can be used as processing unit 401. System bus 403 may be any of several types of bus structure including a memory bus or memory controller, a peripheral bus, and a local bus using any of a variety of bus architectures. System memory 402 includes read only memory (ROM) 404 and random access memory (RAM) 405. A basic input/output system (BIOS) 406 can reside in ROM 404 containing the basic routines that help to transfer information among elements within control system 140.

Control system 140 can include a hard disk drive 407, magnetic disk drive 408, e.g., to read from or write to removable disk 409, and an optical disk drive 410, e.g., for reading CD-ROM disk 411 or to read from or write to other optical media. Hard disk drive 407, magnetic disk drive 408, and optical disk drive 410 are connected to system bus 403 by a hard disk drive interface 412, a magnetic disk drive interface 413, and an optical drive interface 414, respectively. The drives and associated computer-readable media provide nonvolatile storage of data, data structures, and computer-executable instructions for control system 140. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 405, including operating system 415, one or more application programs 416, other program modules 417, and program data 418. In some examples, the application programs 416 can include an algorithm for adjusting the control valve 123 (FIG. 1) and thereby regulating the flow of the pressurized air into the seal housing 204 (FIG. 2). In particular, such an algorithm may be configured to adjust the operational position of the control valve 123 to increase a pressure within the seal housing 204 when a pressure inside the bearing housing 108 (FIG. 1) exceeds a predetermined pressure range, and further configured to adjust the operational position of the control valve 123 to increase the pressure within the seal housing 204 when the pressure inside the bearing housing 108 descends below the predetermined pressure range. The application programs 416 can also include an algorithm for comparing the flow rate measurements obtained from the flow meters 146*a*,*b* (FIG. 1). Modules for instructing the motors 125, 136 (FIG. 1), calculating pressure differentials, comparing the pressure differentials, etc. may also be included in the application programs 416.

A user may enter commands and information into control system 140 through one or more input devices 420, such as a pointing device (e.g., a mouse, touch screen), keyboard, microphone, joystick, game pad, scanner, and the like. For instance, the user can employ input device 420 to enter predefined pressure ranges for comparison with the upstream pressure reading 222 in step 304, and predefined thresholds for comparison with the pressure differential 220 in step 310. These and other input devices 420 are often connected to processing unit 402 through a corresponding port interface 422 that is coupled to the system bus, but may be connected by other interfaces, such as a parallel port, serial port, or universal serial bus (USB). One or more output devices 424 (e.g., display, a monitor, printer, projector, or other type of displaying device) is also connected to system bus 403 via interface 426, such as a video adapter.

Control system 140 may operate in a networked environment using logical connections to one or more remote computers, such as remote computer 428. Remote computer 428 may be a workstation, computer system, router, peer device, or other common network node, and typically includes many or all the elements described relative to control system 140. The logical connections, schematically indicated at 430, can include a local area network (LAN) and a wide area network (WAN). When used in a LAN networking environment, control system 140 can be connected to the local network through a network interface or adapter 432. When used in a WAN networking environment, control system 140 can include a modem, or can be connected to a communications server on the LAN. The modem, which may be internal or external, can be connected to system bus 403 via an appropriate port interface. In a networked environment, application programs 416 or program data 418 depicted relative to control system 140, or portions thereof, may be stored in a remote memory storage device 440.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including." "comprises", and/or "comprising." and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A bearing lubrication system, comprising:
 a bearing including a bearing housing into which a rotor shaft extends from rotating equipment;
 a lubricant reservoir containing a liquid lubricant and in fluid communication with the bearing housing;
 a seal assembly arranged laterally adjacent the bearing housing and including a seal housing that receives a portion of the rotor shaft;
 an air supply line in fluid communication with the seal housing to inject pressurized air into the seal housing;
 a control valve arranged within the air supply line and adjustable to regulate a flow of the pressurized air into the seal housing; and
 a control system in communication with the control valve to adjust an operational position of the control valve,
 wherein, when a pressure inside the bearing housing exceeds a predetermined pressure range, the control system is programmed to adjust the operational position of the control valve to increase a pressure within the seal housing, and
 wherein, when the pressure within the bearing housing descends below the predetermined pressure range, the control system is programmed to adjust the operational position of the control valve to decrease the pressure within the seal housing.

2. The bearing lubrication system of claim 1, further comprising:
a pressure gauge in communication with the bearing housing to measure the pressure within the bearing housing; and
a pressure transmitter in communication with the control system to transmit pressure readings obtained by the pressure gauge to the control system.

3. The bearing lubrication system of claim 1, further comprising:
a blower in fluid communication with the lubricant reservoir and operable to create a vacuum inside the lubricant reservoir; and
a motor operatively coupled to the blower and operable to alter a speed of the blower and thereby alter the pressure within the lubricant reservoir,
wherein the control system is in communication with the motor and programmed to increase the speed of the blower when the pressure of the bearing housing exceeds the predetermined pressure range, and thereby increase the vacuum within the lubricant reservoir, and
wherein the control system is further programmed to decrease the speed of the blower when the pressure inside the bearing housing descends below the predetermined pressure range, and thereby decrease the vacuum within the lubricant reservoir.

4. The bearing lubrication system of claim 1, further comprising:
a supply line that conveys the liquid lubricant to the bearing housing from the lubricant reservoir;
a return line that conveys used liquid lubricant from the bearing housing to the lubricant reservoir;
a first flowmeter in communication with the control system and operable to measure a flow rate of the liquid lubricant in the supply line; and
a second flowmeter in communication with the control system and operable to measure the flow rate of the used liquid lubricant in the return line,
wherein the control system is programmed to receive flow rate measurements from the supply and return lines, compare the flow rate measurements, and transmit an alert when a difference in the flow rate measurements exceeds a predetermined value.

5. The bearing lubrication system of claim 4, wherein the alert is selected from the group consisting of an audible signal, a visual signal, a notification sent to an operator, and any combination thereof.

6. The bearing lubrication system of claim 1, further comprising:
a main drain line in fluid communication with the seal housing to receive at least a portion of the liquid lubricant that migrates from the bearing housing into the seal housing; and
a lubricant disposal tank in communication with the main drain line to receive the liquid lubricant that migrates into the seal housing.

7. The bearing lubrication system of claim 6, further comprising one or more lubricant accumulation chambers defined in the seal housing to receive the liquid lubricant that has migrated into the seal assembly, the one or more lubricant accumulation chambers being in fluid communication with the main drain line.

8. The bearing lubrication system of claim 1, further comprising a packing seal interposing the seal assembly and the rotating equipment to receive and absorb liquid lubricant migrating out of the seal assembly.

9. The bearing lubrication system of claim 1, wherein the seal assembly comprises a labyrinth seal providing a plurality of teeth extending radially inward from the seal housing and toward the rotor shaft.

10. The bearing lubrication system of claim 1, wherein the liquid lubricant comprises one of a petroleum oil and a synthetic lubricant.

11. The bearing lubrication system of claim 1, wherein the rotating equipment is selected from the group consisting of a turbomachine, a turbine, a compressor, a pump, an expander, a motor, a gearbox, and any combination thereof.

12. A method of lubricating a bearing, comprising:
conveying a liquid lubricant from a lubricant reservoir to a bearing housing of the bearing, wherein a rotor shaft extends from rotating equipment and into the bearing housing;
injecting pressurized air from an air supply line into a seal housing of a seal assembly arranged laterally adjacent the bearing housing, wherein a portion of the rotor shaft extends into the seal housing;
measuring a pressure within the bearing housing and transmitting pressure readings of the bearing housing to a control system in communication with a control valve arranged within the air supply line;
adjusting an operational position of the control valve with the control system to increase a pressure within the seal housing when the pressure inside the bearing housing exceeds a predetermined pressure range; and
adjusting the operational position of the control valve with the control system to decrease the pressure within the seal housing when the pressure within the bearing housing descends below the predetermined pressure range.

13. The method of claim 12, further comprising:
creating a vacuum inside the lubricant reservoir with a blower in fluid communication with the lubricant reservoir;
driving operation of the blower with a motor operatively coupled to the blower and in communication with the control system;
sending a command signal to the motor from the control system to increase a speed of the blower when the pressure within the bearing housing exceeds the predetermined pressure range, and thereby increasing a vacuum within the lubricant reservoir; and
sending a command signal to the motor from the control system to decrease the speed of the blower when the pressure inside the bearing housing descends below the predetermined pressure range, and thereby decreasing the vacuum within the lubricant reservoir.

14. The method of claim 12, further comprising:
conveying the liquid lubricant to the bearing housing from the lubricant reservoir via a supply line;
conveying used liquid lubricant from the bearing housing to the lubricant reservoir via a return line;
measuring a flow rate of the liquid lubricant in the supply line with a first flowmeter in communication with the control system;
measuring the flow rate of the used liquid lubricant in the return line with a second flowmeter in communication with the control system;
comparing flow rate measurements from the supply and return lines with the control system; and
transmitting an alert when a difference in the flow rate measurements exceeds a predetermined value.

15. The method of claim 12, further comprising receiving and absorbing liquid lubricant migrating out of the seal assembly with a packing seal interposing the seal assembly and the rotating equipment.

* * * * *